(12) United States Patent
Cassidy

(10) Patent No.: US 6,443,607 B1
(45) Date of Patent: Sep. 3, 2002

(54) HEADLAMP ADJUSTING ATTACHMENT NUT

(75) Inventor: Todd E. Cassidy, Medina, OH (US)

(73) Assignee: Trans Technology Engineered Components, LLC, Brunswick, OH (US)

( * ) Notice: Subject to any disclaimer, the term of this patent is extended or adjusted under 35 U.S.C. 154(b) by 0 days.

(21) Appl. No.: 09/487,520

(22) Filed: Mar. 29, 2000

(51) Int. Cl.[7] .............................. F21V 21/30; F21V 17/02
(52) U.S. Cl. ...................... 362/515; 362/524; 362/528; 362/421
(58) Field of Search ................................ 362/514, 515, 362/524, 528, 421, 457

(56) References Cited

U.S. PATENT DOCUMENTS

| | | | | |
|---|---|---|---|---|
| 5,031,079 A | * | 7/1991 | Kathmann | 362/515 |
| 5,221,137 A | * | 6/1993 | Lovelace et al. | 362/528 |
| 5,483,425 A | * | 1/1996 | Luallin et al. | 362/528 |
| 5,615,939 A | * | 4/1997 | Dobler et al. | 362/515 |
| 5,741,059 A | * | 4/1998 | Kusagaya | 362/528 |

* cited by examiner

*Primary Examiner*—Alan Cariaso
(74) *Attorney, Agent, or Firm*—Vytas R. Matas

(57) ABSTRACT

The present invention is drawn to a coupling nut for connecting an automotive headlamp adjustment assembly to a tubular protrusion or boss of a headlight reflector forming part of the headlamp assembly wherein the coupling nut has a tubular opening at one end thereof which fits over the tubular protrusion of the headlamp reflector and a cup shaped opening at the opposite end and a circumferential cut out area with a flexible inclined plane therein to allow an easy snap-in of the nut to a pair of protrusions extending from the outside surface of the tubular protrusion.

12 Claims, 3 Drawing Sheets

HEADLAMP ADJUSTING ATTACHMENT NUT

BACKGROUND OF THE INVENTION

1. Field of the Invention

The present invention is generally drawn to automotive vehicle headlamp aiming adjusters and more particularly to attachment nuts for coupling right angle headlamp-adjusting assemblies to reflector housings of a headlamp assembly to allow for ease of adjustment.

2. Description of the Prior Art

Vehicle headlamps require horizontal and vertical adjustment to meet government headlamp aiming regulations. The headlamp assembly is mounted to a fixed portion or panel of the vehicle. A reflector housing is part of the headlamp assembly and may be formed to adjust both vertically and horizontally either separately from or integrally with the headlamp assembly. The top end of the reflector housing has a boss formed as a tubular section and is used to mount a vertical adjuster which typically contacts the reflector housing along the reflector housing top end to be vertically aligned with a fixed pivotal point. Generic adjuster assemblies do not easily fit this boss and thus need a transition or coupling nut between the boss and the adjuster assembly to provide easy adjustment by the adjustment assembly relative to the boss.

To make vertical adjustments, the vertical adjuster shaft of the adjusting assembly is rotated in or out, causing a movement of a horizontal member of the adjuster assembly to move in or out. This horizontal member pushes on the boss making the reflector housing to tilt up or down. If the reflector housing is formed integrally with the headlamp assembly, then the entire headlamp assembly will tilt up or down along with the reflector housing.

To minimize space requirements the generic adjuster assemblies locate the vertical input shaft in a region vertically upward from the headlamp assembly reflector housing where it may be more conveniently reached. This mounting allows compact packaging designs in the vehicle which would not be allowed by hand access immediately rearward of the adjuster assembly.

Such adjuster assemblies are well known and may be found in prior art patents to which the reader is referred for a more detailed explanation of its operation. By way of example, U.S. Pat. No. 5,365,415 to Schmitt et al. teaches an adjustable reflector assembly wherein the lateral drive shaft or the gearbox assembly is attached to the reflector by way of coupling nut. However, the nut while having a ball end coupling of the gearbox thereto provides no teaching of a pair of inclined plane openings formed in the nut to snap in a pair of boss members formed in a tubular reflector housing itself to capture the reflector housing to the nut and gearbox. Also, there is no teaching of any adjustment or orientation ribs formed on the nut as per the present invention.

U.S. Pat. No. 5,414,602 to Young et al. teaches another adjustable reflector assembly wherein the gearbox lateral drive shaft end is mounted directly to the reflector to provide adjustment thereto. Again, however, there is no teaching of the nut coupling of the present invention let alone the adjustability features inherent therein.

U.S. Pat. No. 5,193,905 teaches an adjustable headlamp assembly wherein the ball end of a lateral drive shaft extending from a gearbox assembly is directly coupled to a headlamp assembly to adjust the assembly. Again, there is no teaching of the nut coupling of the present invention let alone the adjustable features inherent therein.

It is thus seen that the prior art failed to provide an attachment for coupling a known adjuster assembly to a boss found on a headlamp reflector housing which could be easily and adjustably snapped on the boss for easy reflector housing positioning. As was mentioned, if the reflector housing is manufactured to be integral with the headlamp assembly, then the entire headlamp assembly is positioned along with the reflector housing.

SUMMARY OF THE INVENTION

The present invention solves the problems associated with prior art devices as well as other by providing an improved automotive headlight reflector adjustment assembly. The assembly includes a unique snap on adjustment or coupling nut which couples with a tubular boss or protrusion formed as a part of the reflector in one corner thereof. The tubular protrusion has a pair of oppositely located members formed on the outside surface of the protrusion which ride along a pair of flexible inclined plane openings formed in the tubular opening on one end of the coupling nut to snap into a depression formed at the end of the inclined plane openings to positively retain the nut on the tubular protrusion of the headlamp reflector. The oppositely located members need not be directly opposite each other (180 degrees apart). In the present application, these members are 165 degrees apart due to tooling constraints.

The other end of the coupling nut has a ball shaped opening to retain a ball shaped end of a horizontally moving shaft of a known right angle adjustment assembly to provide adjustment of the reflector when the vertical input drive of the adjuster is rotated to move the horizontal shaft against the boss.

The coupling nut also has a pair of ribs extending vertically along the outside surface thereof to provide a positive non-slip grasp of the nut while it is being mounted to the tubular protrusion of the reflector housing. A pair of end located horizontal ribs are also provided for an alternate grasping location. Also, a horizontally located rib is formed along the circumference of the nut parallel with the end located rib to thus provide a two point orientation of the nut with the reflector housing to insure the mount of the nut and gearbox assembly to the reflector with the driving vertical end of the gearbox being perpendicular to the reflector insuring accessible mounting of the adjustment assembly when the headlamp assembly is mounted to the vehicle.

In view of the foregoing it will be seen that one aspect of the present invention is to provide a coupling nut between a boss formed on a headlamp reflector assembly and a known adjuster assembly for adjusting the aim of the reflector assembly.

Another aspect is to provide an easily snapped on coupling nut between a boss on a headlamp reflector assembly and a known adjuster assembly.

Yet another aspect of the present invention is to provide easily grasped members on the coupling nut to allow the nut to be rotatably snapped on to the reflector assembly.

Still yet another aspect of the present invention is to provide alignment means on the nut to insure proper orientation of the vertical input shaft of the adjustment assembly to the reflector assembly.

These and other aspects of the present invention will become more readily apparent upon a careful review of the following description of the preferred embodiment when considered along with the accompanying drawings.

DETAILED DESCRIPTION OF THE PREFERRED EMBODIMENT

Figure 1:
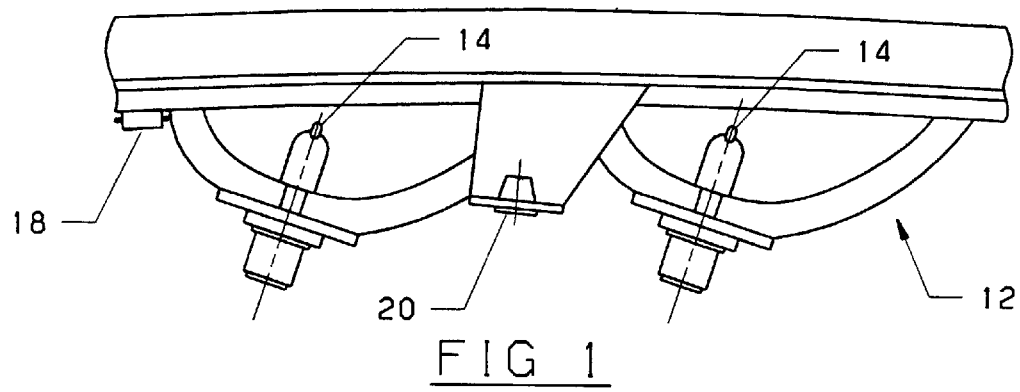
FIG. 1 is a top plane elevation view of a typical two-headlight reflector assembly having an integrally formed tubular boss at on end thereof.
Figure 2:
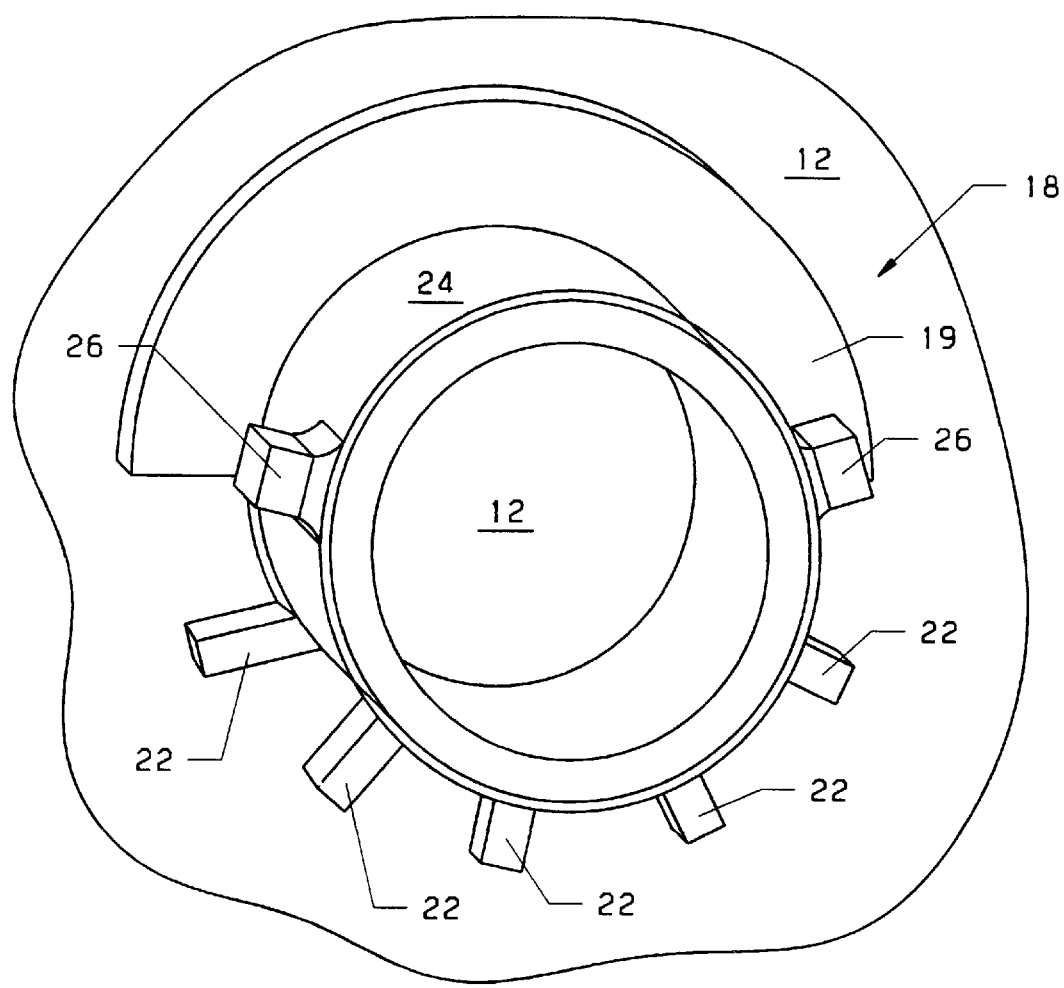
FIG. 2 is an expanded perspective view of the boss of the FIG. 1 reflector assembly.

Referring now to the drawings where the showings are to describe a preferred embodiment of the inventory without limiting it to same, and to FIGS. 1, 2 in particular, a left front headlamp assembly 10 is shown to have a dual reflector housing assembly. As shown, the reflector housing has two bulbs 14 providing a source of illumination. Fixably attached to the reflector housing 12 is a lens 16. As shown, the lens 16 is fixably connected to the reflector housing 12.

The reflector housing 12 is connected to the vehicle body via a vehicle body panel (not shown) by a fixed pivot rod.

The reflector assembly 12 is made pivotable both horizontally and vertically in a known manner by the application of a force to bosses 18 and 20 respectively. The tubular boss 18 is located at one end of the reflector assembly 12 and is formed integrally therewith in the molding process making the reflector housing.

The tubular boss member 18 is best seen in FIG. 2 and includes a ring member comprising a solid top portion 19 and lower spoke members 22. The ring member is added to provide strength while the spoke members 22 of the ring save on material costs while retaining the needed strength.

Figure 3:
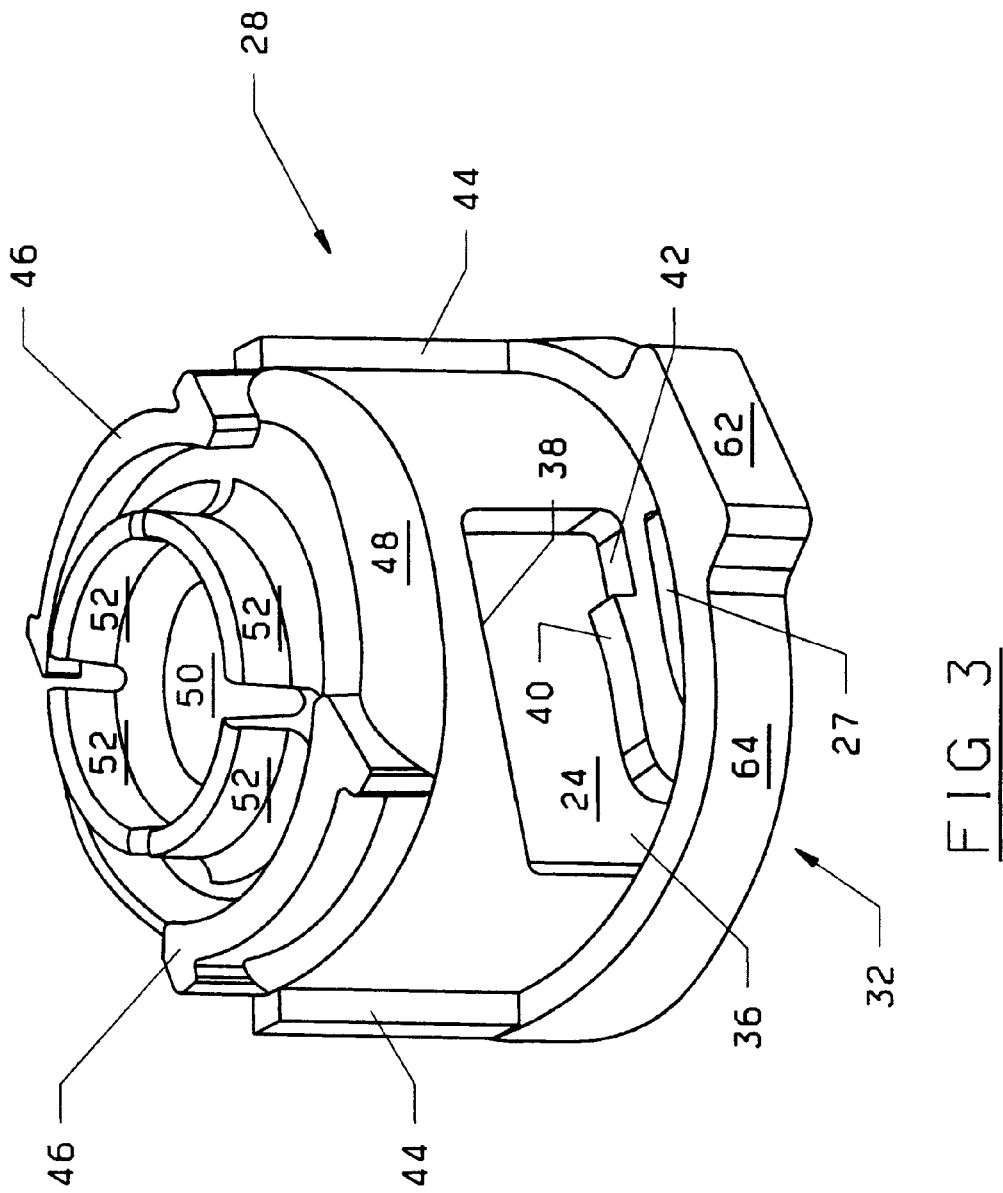
FIG. 3 is a perspective view of the coupling nut of the present invention.

A centrally located tubular member 24 extends from the ring and includes a pair of box-like members 26 extending outwardly from the tubular member 24 on opposite sides thereof. These members 26 are used to lock a coupling nut 28, best seen in FIG. 3, to the reflector assembly 12 to allow the coupling of a known right angle adjustment assembly 30, best seen in FIG. 5 to the nut 28 to adjust the angle of the reflector assembly 12.

Figure 4:
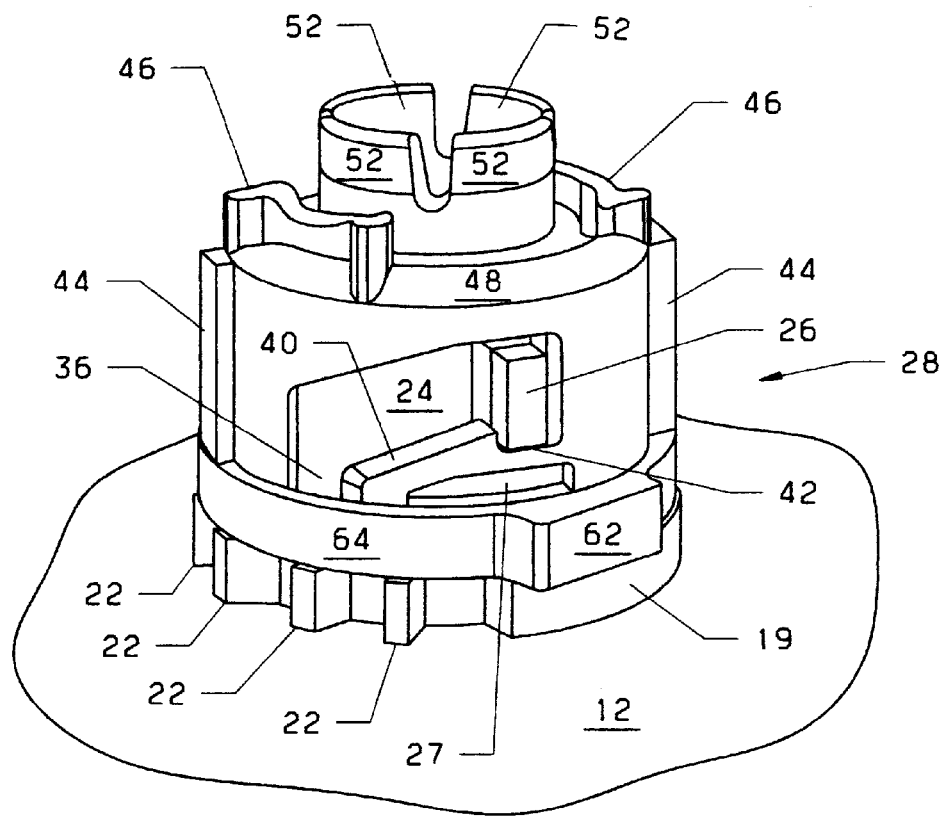
FIG. 4 is a perspective view of the coupling nut of FIG. 3 snap mounted on the boss member of FIG. 2.

The coupling nut 28 is injection molded from acetal thermoplastic material because of its strength and relative flexibility, which facilitates the snap in function of the nut 28 to the box like members 26 of the tubular boss 20. The coupling nut 28 is formed as a tubular member having a tubular cavity 32 at one end which is slightly larger in diameter than the tubular member 24 of the boss 20 to allow the member 24 to slip fit thereon. Cut out areas 34 are located at opposite sides of the nut member 28, not necessarily 180 degrees apart due to tooling constraints of the reflector housing, to align with the box like member 26 of the tubular member 24. The cutout areas 34 have passages 36, which allow the box like protrusions 26 from the member 24 to be guided into the cut out areas 34. The cut out areas 34 are bounded by the top walls 38 and flexible inclined plane members 40 below the top walls 38. Twisting the nut 28 on the member 24 now allows the members 26 to ride along the inclined plane 40 depressing same into the openings 27 formed under them until the members 26 are captured in a depression 42 formed at the ends of the flexible inclined planes 40. The flexible planes 40 are now returned near their original position as best seen in FIG. 4.

To ease the rotation of the nut 28 on the member 24 and the depression of the flexible inclined plane 40, a pair of vertical bar members 44 are formed on opposite sides of the nut member 28, which act as tool and/or hand or finger holds preventing the slippage of the nut 28 in the tool/hand. An alternate pair of horizontal members 46 are formed along the top circumference 48 of the nut 28 to act as alternate tool/finger holds for turning the nut 28 on the ring member 24.

At the end of the nut member 28 opposite the opening 32 there is formed a cup like opening 50 with a plurality of wall members 52 extending up there from. These wall members are flexible and allow the capture of a ball member 58 in the cup like opening 50 by spreading out when the ball is driven into the opening formed by the wall members 52 and then rebounding around the ball 58 when it is driven into the cup like opening 50.

Figure 5:
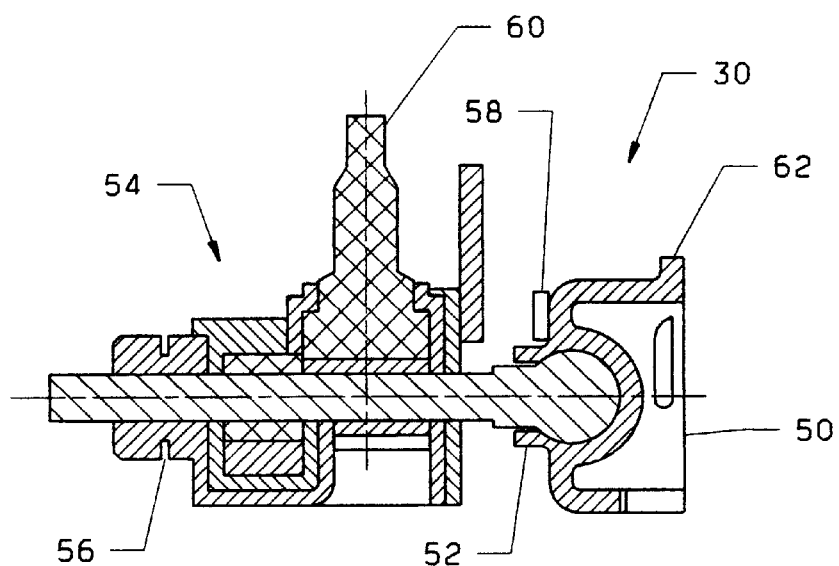
FIG. 5 is a side view of a right angle adjustment assembly.

Turning to FIG. 5, it is seen that a known geared adjustment assembly 54 comprises a laterally or horizontally driven member 56 having the ball like driving head 58 move back and forth in response to the rotation of an input shaft 60 geared to drive the shaft 56 in a known lateral manner. This right angle drive allows the shaft 60 to be located in an easily accessible area of the reflector assembly 12 to drive the shaft 56 which is inaccessible.

The adjustment assembly 54 is connected to the nut member 28 before the nut 28 is mounted on the tubular member 24 of the reflector assembly 12 due to the relative ease of assembly. Thus the ball head 58 is first driven into the cup 50 to firmly seat the assembly 54 to the nut member 28. However, assurance is needed that the drive input 60 will be aligned with the top of the reflector assembly when the nut member 28 is mounted to the boss member 18. To insure this fact, an alignment ridge 62 is formed along the bottom circumference 64 of the nut member 28. The adjustment assembly 54 is thus pressed into the cup 50 with the input shaft 60 aligned with the ridge 62. When thus assembled, the input shaft is readily accessible when the hood of the automobile is raised and a rotation thereof inputs a force to the nut member 28 and therethrough to the reflector assembly 12 to thereby pivot it to the proper location.

Certain modifications and additions have been deleted herein for the sake of conciseness and readability but are properly within the scope of the following claims.

What is claimed is:

1. A pivotable automotive reflector assembly comprising:
   a reflector assembly;
   a boss member formed at a pivotable location on said reflector assembly integrally therewith;
   a right angle adjustment drive assembly having a substantially vertical input member geared to drive a substantially horizontal driven member; and
   a coupling member connectable to said boss member at one end and to said horizontally driven member at the opposite end thereof by way of an externally located cup assembly.

2. A pivotable automotive reflector assembly as claimed in claim 1 wherein said boss member is formed as a tubular protrusion from said reflector assembly and said coupling member is formed as a complimentary tubular member extending over said tubular protrusion.

3. A pivotable automotive reflector assembly as claimed in claim 2 wherein said tubular protrusion has an outwardly extending box like member which snaps into a depression formed in said coupling member to lock said coupling member to said tubular protrusion thereby.

4. A pivotable automotive reflector assembly as claimed in claim 3 wherein said coupling member has a pair of vertical ribs extending lengthwise along an outside surface of said coupling member to allow a non-slip rotation of said coupling member on said tubular protrusion.

5. A pivotable automotive reflector assembly as claimed in claim 4 wherein said coupling member has a pair of horizontal members along one end of said coupling member to allow a non-slip rotation of said tubular member on said tubular protrusion.

6. A pivotable automotive reflector assembly as claimed in claim 2 wherein said cup assembly is formed to have a ball retaining assembly at said one end of said tubular member and said right angle drive has a lateral drive shaft having a ball at one end thereof to couple with said ball retaining assembly and an input drive shaft at a right angle to said ball retaining assembly.

7. A pivotable automotive reflector assembly as claimed in claim 6 wherein said coupling member has an alignment ridge at a second end of said tubular member opposite said one end for orienting said input drive shaft thereto to insure proper location of said drive shaft with respect to said reflector assembly.

8. A coupling nut connecting to a tubular protrusion of a headlight reflector assembly having a protruding member extending out from the tubular protrusion comprising:

a tubular member having a tubular opening at one end thereof which fits over the tubular protrusion;

said tubular member having an externally located cup shaped opening at the end opposite the tubular opening; and said tubular member having a circumferential cut out area with a flexible member formed therein to allow the protruding member to move in said cut out area along said flexible member.

9. A coupling nut as set forth in claim 8 wherein said cut out area has a depression formed at the end of said flexible member.

10. A coupling nut as set forth in claim 9 wherein said tubular member has a pair of vertical ribs extending along an outer surface of said tubular member to allow a non-slip rotation of said tubular member on said tubular protrusion.

11. A coupling nut as set forth in claim 9 wherein said tubular member has a pair of horizontal members at one end to allow a non-slip rotation of said tubular member on said tubular protrusion of said headlight assembly.

12. A coupling nut as set forth in claim 8 wherein said cup shaped opening has a plurality of flexible members extending therefrom.

* * * * *